US011304246B2

(12) United States Patent
Ponnusamy et al.

(10) Patent No.: US 11,304,246 B2
(45) Date of Patent: Apr. 12, 2022

(54) PROXIMITY-BASED PAIRING AND OPERATION OF USER-SPECIFIC COMPANION DEVICES

(71) Applicant: MICROSOFT TECHNOLOGY LICENSING, LLC, Redmond, WA (US)

(72) Inventors: Kruthika Ponnusamy, Redmond, WA (US); Shivaram Prabhakar, Bothell, WA (US); Arash Ghanaie-Sichanie, Woodinville, WA (US); Shri Vidhya Alagesan, Sammamish, WA (US); Ashish Mehta, Issaquah, WA (US); Samarth Gupta, Redmond, WA (US); Rama Krishna Prasad Satya Prakash, Redmond, WA (US); Prasad Thiruveedu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/714,329

(22) Filed: Dec. 13, 2019

(65) Prior Publication Data
US 2021/0136846 A1 May 6, 2021

Related U.S. Application Data

(60) Provisional application No. 62/929,744, filed on Nov. 1, 2019.

(51) Int. Cl.
*H04W 76/14* (2018.01)
*H04W 4/02* (2018.01)

(52) U.S. Cl.
CPC ........... *H04W 76/14* (2018.02); *H04W 4/023* (2013.01)

(58) Field of Classification Search
CPC ........ H04W 76/14; H04W 4/023; H04L 9/06; H04L 9/0897; G06Q 20/4014; G06Q 20/389
See application file for complete search history.

(56) References Cited

U.S. PATENT DOCUMENTS 7,279,060 B2   10/2007   Chen et al.
7,554,571 B1   6/2009    Beck et al.
(Continued)

FOREIGN PATENT DOCUMENTS

CN   103053150 A   4/2013
CN   104685864 A   6/2015
(Continued)

OTHER PUBLICATIONS

"Second Office Action and Search Report Issued in Chinese Patent Application No. 201780067116.9", dated Feb. 10, 2021, 14 Pages.
(Continued)

*Primary Examiner* — Iqbal Zaidi
(74) *Attorney, Agent, or Firm* — NovoTechIP International PLLC

(57) ABSTRACT

A server allows pairing of a computing device with a companion computing device so that they may automatically connect to one another in the future. Pairing is accomplished by responding to a user request to pair a particular companion device by identifying computing devices associated with a particular user account, and directing those devices to monitor whether they are in range of a proximity signal (such as a BLUETOOTH® signal). A user interface on the companion device displays a list of devices specific to the user that are in proximity to the companion computing device, so that the user can choose a device to pair with the companion computing device.

23 Claims, 9 Drawing Sheets

(56) References Cited

U.S. PATENT DOCUMENTS

| | | | |
|---|---|---|---|
| 8,081,205 B2 | 12/2011 | Baird et al. | |
| 8,350,891 B2 | 1/2013 | Khot et al. | |
| 8,379,077 B2 | 2/2013 | Wu et al. | |
| 8,503,651 B2 | 8/2013 | Virolainen et al. | |
| 8,786,517 B2 | 7/2014 | Lewin et al. | |
| 8,896,651 B2 | 11/2014 | Chu et al. | |
| 8,934,382 B2 | 1/2015 | Rodman et al. | |
| 9,088,694 B2 | 7/2015 | Navon et al. | |
| 9,131,333 B2 | 9/2015 | Gai et al. | |
| 9,148,627 B2 | 9/2015 | Anderson et al. | |
| 9,172,908 B2 | 10/2015 | Kert et al. | |
| 9,369,672 B2 | 6/2016 | Hiller et al. | |
| 9,400,895 B2 | 7/2016 | Dadu et al. | |
| 9,445,054 B2 | 9/2016 | Kato | |
| 9,467,657 B2 | 10/2016 | Decker et al. | |
| 9,609,030 B2 | 3/2017 | Sun et al. | |
| 9,615,058 B2 | 4/2017 | Mattson | |
| 9,801,219 B2 | 10/2017 | Sonnino et al. | |
| 10,321,093 B2 | 6/2019 | Duckworth et al. | |
| 10,362,272 B1 | 7/2019 | Van Os et al. | |
| 10,368,032 B2 | 7/2019 | Visosky | |
| 10,824,384 B2 | 11/2020 | Somaiah et al. | |
| 10,838,681 B2 | 11/2020 | Watson et al. | |
| 10,841,174 B1 | 11/2020 | Ely et al. | |
| 10,999,331 B1* | 5/2021 | Marchand | H04L 65/403 |
| 2003/0048174 A1 | 3/2003 | Stevens et al. | |
| 2003/0055977 A1 | 3/2003 | Miller | |
| 2006/0092269 A1 | 5/2006 | Baird et al. | |
| 2006/0132473 A1 | 6/2006 | Fuller et al. | |
| 2006/0224882 A1 | 10/2006 | Chin | |
| 2007/0112942 A1 | 5/2007 | Moquin et al. | |
| 2007/0150953 A1 | 6/2007 | Hamid et al. | |
| 2007/0300165 A1 | 12/2007 | Haveliwala et al. | |
| 2008/0043986 A1 | 2/2008 | Darby et al. | |
| 2008/0160977 A1 | 7/2008 | Ahmaniemi et al. | |
| 2008/0281971 A1 | 11/2008 | Leppanen et al. | |
| 2010/0009719 A1 | 1/2010 | Oh et al. | |
| 2011/0119389 A1 | 5/2011 | Cavin et al. | |
| 2011/0271207 A1 | 11/2011 | Jones et al. | |
| 2011/0292161 A1 | 12/2011 | Sharon et al. | |
| 2012/0280790 A1 | 11/2012 | Gerhardt et al. | |
| 2012/0284643 A1 | 11/2012 | Sitrick et al. | |
| 2012/0297306 A1 | 11/2012 | Hassan et al. | |
| 2013/0065526 A1 | 3/2013 | Pottier et al. | |
| 2013/0106976 A1 | 5/2013 | Chu et al. | |
| 2013/0111555 A1* | 5/2013 | Leneel | G06F 21/34 726/4 |
| 2013/0169526 A1 | 7/2013 | Gai et al. | |
| 2013/0214995 A1 | 8/2013 | Lewin et al. | |
| 2013/0219288 A1 | 8/2013 | Rosenberg | |
| 2013/0219303 A1 | 8/2013 | Eriksson et al. | |
| 2013/0295882 A1 | 11/2013 | Zhao | |
| 2014/0006495 A1 | 1/2014 | Adderly et al. | |
| 2014/0026070 A1 | 1/2014 | Tandon et al. | |
| 2014/0028726 A1 | 1/2014 | Dave et al. | |
| 2014/0155169 A1 | 6/2014 | Crevin et al. | |
| 2014/0157185 A1 | 6/2014 | Moromisato et al. | |
| 2014/0282967 A1 | 9/2014 | Maguire et al. | |
| 2014/0313282 A1 | 10/2014 | Ma et al. | |
| 2014/0315489 A1 | 10/2014 | Lee | |
| 2014/0340468 A1 | 11/2014 | Winterstein | |
| 2014/0344446 A1 | 11/2014 | Freedman et al. | |
| 2014/0368603 A1 | 12/2014 | Kert et al. | |
| 2015/0124950 A1 | 5/2015 | Koenig | |
| 2015/0248468 A1 | 9/2015 | Cheng | |
| 2015/0271273 A1 | 9/2015 | Glass et al. | |
| 2015/0347738 A1 | 12/2015 | Ulrich et al. | |
| 2016/0212181 A1 | 7/2016 | Zhang et al. | |
| 2016/0241605 A1 | 8/2016 | Taboriskiy et al. | |
| 2016/0261658 A1 | 9/2016 | Taylor et al. | |
| 2016/0323290 A1 | 11/2016 | Stead et al. | |
| 2016/0342784 A1 | 11/2016 | Beveridge et al. | |
| 2016/0366713 A1 | 12/2016 | Sonnino et al. | |
| 2016/0378417 A1 | 12/2016 | Kenjalkar | |
| 2017/0097678 A1 | 4/2017 | Mclean | |
| 2017/0104831 A1 | 4/2017 | Fransen | |
| 2017/0171699 A1 | 6/2017 | Jin et al. | |
| 2017/0244811 A1 | 8/2017 | Mckenzie et al. | |
| 2017/0311365 A1 | 10/2017 | Molettiere et al. | |
| 2018/0124128 A1 | 5/2018 | Faulkner et al. | |
| 2018/0267774 A1 | 9/2018 | Williams et al. | |
| 2018/0270340 A1 | 9/2018 | Ahmad et al. | |
| 2019/0173745 A1 | 6/2019 | Rjeili et al. | |
| 2019/0321732 A1 | 10/2019 | Zimring et al. | |
| 2019/0332344 A1 | 10/2019 | Somaiah et al. | |
| 2019/0372988 A1 | 12/2019 | Schirdewahn et al. | |
| 2021/0004454 A1 | 1/2021 | Chester et al. | |
| 2021/0045169 A1* | 2/2021 | Pupakdee | H04L 9/3271 |
| 2021/0136129 A1 | 5/2021 | Ponnusamy et al. | |
| 2021/0136130 A1 | 5/2021 | Ponnusamy et al. | |

FOREIGN PATENT DOCUMENTS

| | | |
|---|---|---|
| CN | 105264883 A | 1/2016 |
| CN | 105474653 A | 4/2016 |
| CN | 105704426 A | 6/2016 |
| EP | 1220501 B1 | 7/2008 |
| EP | 2587799 A1 | 5/2013 |
| WO | 0031608 A2 | 6/2000 |
| WO | 2016149294 A1 | 9/2016 |
| WO | 2016195825 A1 | 12/2016 |

OTHER PUBLICATIONS

"International Search Report and Written Opinion Issued in PCT Application No. PCT/US20/055444", dated Feb. 2, 2021, 13 Pages.

"International Search Report and Written Opinion Issued in PCT Application No. PCT/US20/055445", dated Jan. 28, 2021, 11 Pages.

"Lock Your Windows 10 PC Automatically When You Step Away From It", Retrieved from: https://web.archive.org/web/20190518143337/https://support.microsoft.com/en-in/help/4028111/windows-lock-your-windows-10-pc-automatically-when-you-step-away-from, May 18, 2019, 02 Pages.

"Final Office Action Issued in U.S. Appl. No. 16/724,116", dated Oct. 8, 2020, 13 Pages.

"International Search Report and the Written Opinion Issued in PCT Application No. PCT/US20/055451", dated Jan. 15, 2021, 11 Pages.

"Notice of Allowance Issued in U.S. Appl. No. 16/724,111", dated Feb. 16, 2021, 6 Pages.

"Four Ways Polycom is Redefining Video Collaboration", Retrieved from: http://www.polycom.com/products-services/realpresence-platform/realpresence-web-suite/redefining-video-collaboration.html, Retrieved on: Oct. 21, 2016, 4 Pages.

"GoToMeeting | Global Customer Support", Retrieved from: http://support.citrixonline.com/en_US/meeting/help_files/G2M040004, Oct. 21, 2016, 7 Pages.

"Highfive Sees 300 Percent Growth in Video-Enabled Meeting Rooms", Retrieved from: http://www.marketwired.com/press-release/highfive-sees-300-percent-growth-in-video-enabled-meeting-rooms-2158891.htm, Sep. 15, 2016, 3 Pages.

"How do I Share my Screen in Skype for Windows Desktop?", Retrieved from: https://support.skype.com/en/faq/FA10215/how-do-i-share-my-screen-in-skype-for-windows-desktop, Retrieved on: Oct. 21, 2016, 5 Pages.

"Host Instructions", Retrieved from: https://lwww.freeconferencecall.com/instructions, 2001, 11 Pages.

"Screen share-free. With Web Ex Meetings", Retrieved from: https://www.webex.com/features/screen-share.html, Retrieved on: Oct. 21, 2016, 5 Pages.

"Share your screen", Retrieved from: https://www.uberconference.com/screensharing, Retrieved on: Oct. 21, 2016, 5 Pages.

"Share your Screen During a Hangout", Retrieved from: https://support.google.com/hangouts/answer/1660627?hl=en, retrieved on: Oct. 21, 2016, 2 Pages.

"Final Office Action Issued in U.S. Appl. No. 15/480,325", dated Jun. 22, 2020, 5 Pages.

"Non Final Office Action Issued in U.S. Appl. No. 15/480,325", dated Mar. 21, 2019, 13 Pages.

(56) References Cited

OTHER PUBLICATIONS

"Non Final Office Action Issued in U.S. Appl. No. 15/480,325", dated Nov. 17, 2020, 16 Pages.
"Non-Final Office Action Issued in U.S. Appl. No. 15/480,325", dated Nov. 6, 2019, 14 Pages.
"Final Office Action Issued in U.S. Appl. No. 15/480,332", dated Jan. 29, 2020, 20 Pages.
"Non Final Office Action Issued in U.S. Appl. No. 15/480,332", dated Jun. 27, 2019, 16 Pages.
"Non Final Office Action Issued in U.S. Appl. No. 15/480,332", dated Aug. 24, 2020, 15 Pages.
"Non Final Office Action Issued in U.S. Appl. No. 16/724,111", dated Nov. 4, 2020, 19 Pages.
"First Office Action and Search Report Issued in Chinese Patent Application No. 201780067116.9", dated May 26, 2020, 15 Pages.
He, et al., "Real-time Whiteboard Capture and Processing using a Video Camera for Teleconferencing", In Proceedings of IEEE International Conference on Acoustics, Speech, and Signal Processing, Mar. 2005, 4 Pages.
Hornler,, et al., "Multi-Modal Activity and Dominance Detection in Smart Meeting Rooms", In Proceedings of the IEEE International Conference on Acoustics, Speech, and Signal Processing, Apr. 19, 2009, pp. 1777-1780.
Liu, et al., "Do Handheld Devices Facilitate Face-to-Face Collaboration? Handheld Devices with Large Shared Display Groupware to Facilitate Group Interactions", In Journal of Computer Assisted Learning, vol. 23, Issue 4, May 22, 2007, pp. 285-299.
"International Search Report and Written Opinion Issued in PCT Application No. PCT/US2017/057947", dated Feb. 8, 2018, 14 Pages.
"International Search Report and Written Opinion Issued in PCT Application No. PCT/US2017/057948", dated Feb. 8, 2018, 15 Pages.
Rudnicky, et al., "Intelligently Integrating Information from Speech and Vision Processing to Perform Light-weight Meeting Understanding", In Proceedings of International Workshop on Multimodal Multiparty Meeting Processing, Oct. 2005, pp. 79-84.
Yang, et al., "New Business Development in Triple-Play", In Journal of Telecommunications Science, vol. 27, Issue 3, Mar. 15, 2011, 6 Pages.
"Changing Your Own Video Layout", Retrieved from: https://documentation.avaya.com/bundle/UsingXTSeries_r91/page/xt1000_ug_calls_changeVideoLayout.html, Retrieved Date: Apr. 21, 2020, 3 Pages.
"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Apr. 21, 2020, 3 Pages.
"ViewSplit-Display Layout Software", Retrieved from: https://web.archive.org/web/20170318042724/https:/www.viewsonic.com/us/viewsplit.html, Mar. 18, 2017, 4 Pages.
"Non Final Office Action Issued in U.S. Appl. No. 16/724/116", dated Jun. 11, 2020, 15 Pages.
"Non-Final Office Action Issued in U.S. Appl. No. 16/724,116", dated Apr. 5, 2021, 15 Pages.
"Final Office Action Issued in U.S. Appl. No. 15/480,332", dated Jun. 4, 2021, 18 Pages.
"Office Action Issued in Indian Patent Application No. 201947013660", dated Jun. 27, 2021, 7 Pages.
"Notice of Allowance Issued in U.S. Appl. No. 16/724,111", dated Jul. 22, 2021, 3 Pages.
"Notice of Allowance Issued in U.S. Appl. No. 16/724,111", dated Jul. 7, 2021, 6 Pages.
Krumm, et al., "The NearMe Wireless Proximity Server", In Proceedings of the International Conference on Ubiquitous Computing, Sep. 7, 2004, pp. 283-300.
"Final Office Action Issued in U.S. Appl. No. 16/724,116", dated Sep. 3, 2021, 15 Pages.
"Office Action Issued in European Patent Application No. 17794863.5", dated Sep. 30, 2021, 11 Pages.

* cited by examiner

PROXIMITY-BASED PAIRING AND OPERATION OF USER-SPECIFIC COMPANION DEVICES

TECHNICAL FIELD

The present application relates generally to an automated pairing and lock/unlock system for a companion computing device.

BACKGROUND

As computing devices grow both smaller and more powerful, users have become more mobile. Workplaces are adapting to this trend by providing extra monitors and other peripherals that remain at work, while workers may sometimes perform work tasks elsewhere, either by carrying a portable computer (e.g., a laptop, a tablet, or a smart phone) and/or by working through remote portals that allow files and other information to be saved on a central server and accessed from anywhere. Furthermore, software and hardware tools have become available that allow more work to be performed using only a personal computer, such as the MICROSOFT TEAMS® software that can replace telephone calls with virtual meetings (with or without video) that can include file sharing and joint working documents. When mobile users are constantly moving about and entering and leaving a connection range of their peripherals, providing a seamless experience of pairing and connecting to allow users to focus on work, instead of on details of their network environment, represents a technical problem. Hence, there is a need for a technical solution to provide a seamless pairing and connection experience where details of locating and connecting to other devices are largely invisible to users.

SUMMARY

In one aspect, a pairing system includes a processor, and machine-readable media including instructions. The instructions, when executed by the processor, cause the processor to receive over a communication network a pairing request signal to pair a companion computing device, and, in response to the received pairing request signal, identify a user account associated with the pairing request signal, determine that the identified user account is associated with a first computing device, determine that the first computing device is in proximity to the companion computing device, and pair the companion computing device with the first computing device.

In another aspect, a method of pairing includes receiving a request to pair a companion computing device with a computing device, identifying a user account currently linked with the companion computing device, determining that the user account is associated with a first computing device, in response to the received request, determining that the first computing device is in proximity to the companion computing device, and, in response to determining that the first computing device is in proximity to the companion computing device, sending the companion computing device identifying information for the first computing device, the identifying information being sufficient to permit the companion computing device to present an option to pair the companion computing device to the first computing device.

In another aspect, a server is configured to manage a user device and a companion computing device paired with the user device, the server including a processor and machine-readable media including instructions. The instructions, when executed by the processor, cause the processor to receive a request to lock or unlock from the user device, and in response to the received request, to determine that the user device and the companion computing device are in proximity to one another, and to lock or unlock both the user device and the companion computing device to comply with the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
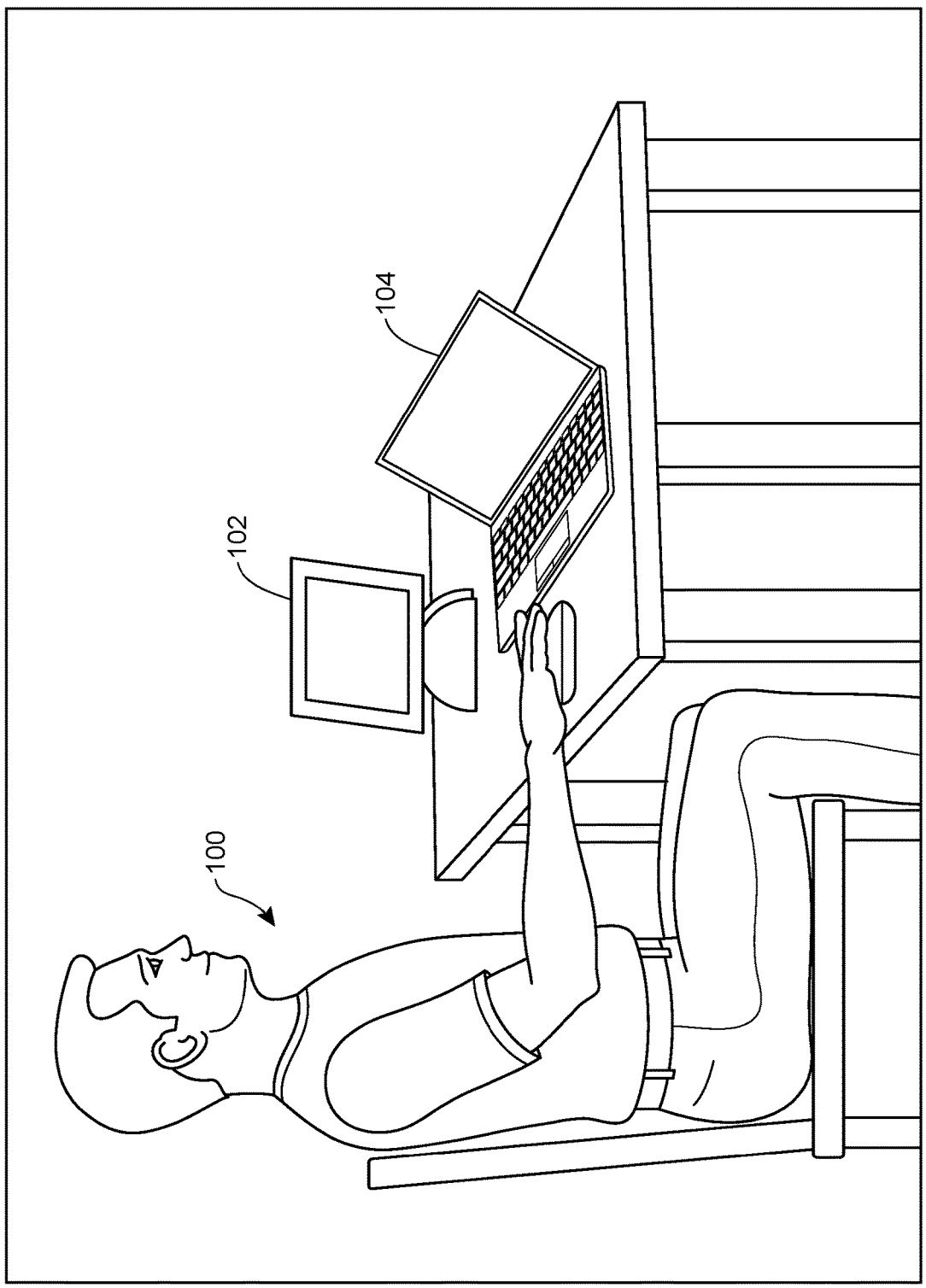
FIG. 1 is a schematic of as user using a computing device and a companion computing device.

FIG. 1 shows generally a user 100 at a desk, using a companion computing device 102 and a computing device 104 (in this case, a laptop computer). While the illustrated device 104 is a laptop computer, companion computing device 102 and computing device 104 may be a laptop computer, a netbook, a desktop computer, a tablet, a mobile phone, a television, and/or a wearable device. The companion computing device and the laptop are logically connected via one or more connection services that allow them to work together, so that, for example, the user 100 may view and share documents on computing device 104 while simultaneously conducting a video conference on companion computing device 102. While companion computing devices can be convenient and provide additional options to users, it is important that each companion computing device be paired with the correct computing device(s). It is disruptive, rather than helpful, in a working environment if video controls on John's computer control Jane's companion device, instead of John's. As used herein, in one implementation, "pairing" one device with another means establishing a logical connection between the devices by the pairing service, so that (for example) the connection service makes paired devices and/or other systems aware of when paired devices are in proximity to each other, prompting corresponding changes in behavior by the paired devices and/or other systems, such as, but not limited to, displaying a particular user interface on one device when the other is in use.

In some workplaces, a given user 100 sits at the same desk day after day, and a network-connected companion computing device 102 at the desk can be paired with a desktop computer 104 that sits on it, so changes in proximity between these two fixed devices may be a relatively rare occurrence. In other workplaces, "hotdesking" policies may mean that a given user sits at a different desk from one day to another and carries a same laptop computer 104 while moving to each desk, or that the user logs into different companion devices 102 and/or computers 104 depending on the day's seating arrangement. In hotdesking workplaces, the user may need to pair to a different companion computing device 102 at the start of successive workdays. In either situation, it is preferable that pairing and subsequent recognition of paired devices be seamless for the user.

In some examples, a companion computing device may, among other things, serve as a replacement or supplement for a conventional desktop phone. For example, a video conference can be conducted using the camera and/or microphone from the companion computing device, but with controls for the call, the ability to screen share, etc., being available on a paired computing device.

Figure 2:
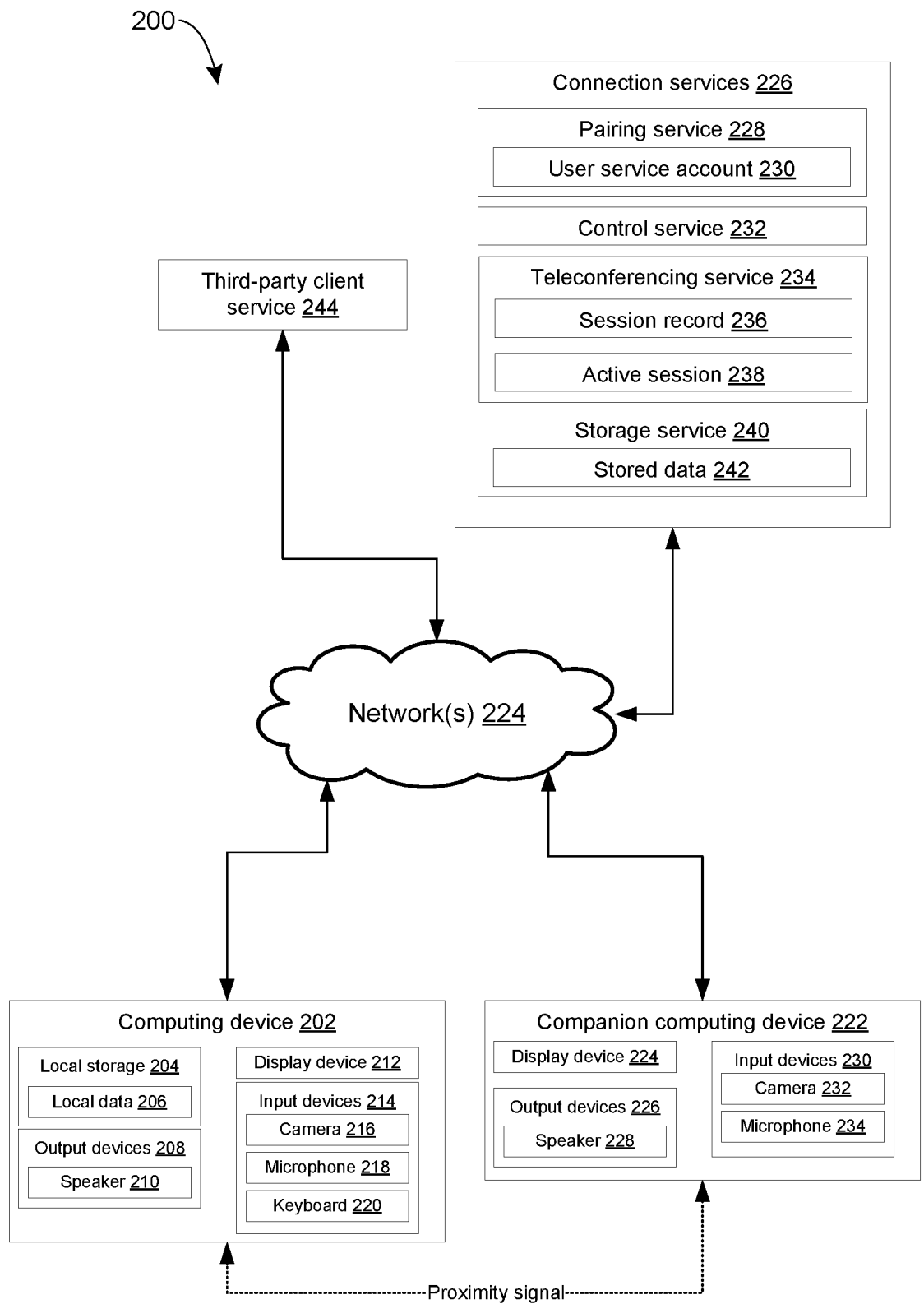
FIG. 2 is a diagram of logical connections between a computing device, a companion computing device, a network, and shared services.

FIG. 2 is a diagram of a system 200 showing logical connections between a computing device, a companion computing device, a network, and services available to the devices for working together. Computing device 202 may be a desktop computer, a laptop computer, a tablet, a mobile phone, a television, a wearable device, or any other computing device that a user wishes to use in the environment. It may include local storage 204 holding local data 206, output device(s) 208 such as a speaker 210, display device(s) 212, and input device(s) 214 such as a camera 216, microphone 218, and/or keyboard 220. Companion computing device 222 may include display device(s) 224, output device(s) 226 such as a speaker 228, and/or input device(s) 230 such as a camera 232 and/or microphone 234. Each of computing device 202 and companion computing device 222 is connected to network(s) 224. Commonly owned application Ser. Nos. 16/724,111 and 16/724,116, filed on Dec. 20, 2019, entitled "USER INTERFACE DISSECTION AND AUGMENTATION" and "TELECONFERENCING INTERFACES AND CONTROLS VIA PAIRED USER COMPUTING DEVICES", which are incorporated by reference herein to the extent not inconsistent herewith, describe ways that computing device 202 and companion computing device 222 can work together to enhance a user experience. The referenced applications describe examples in which the companion computing devices and other computing devices, such as a desktop or mobile computing device, recognize each other's presence and as a result augment each other's functions. For example, a computing device may provide controls (e.g., muting, custom backgrounds, etc.) for a videoconference that is being conducted using the camera and microphone of the companion computing device. When sharing a screen to show a document during a videoconference, the document can be drawn from the computing device while the companion computing device continues to provide the camera and microphone. The devices can work together so that notifications, for example, are displayed on whichever device is not displaying content, so that other participants in the videoconference are not exposed to distracting and possibly sensitive notifications. When the user is not in the midst of a videoconference, the companion computing device may function as an extra monitor, increasing the display space available for work.

Presentation and coordination of these augmentations are generally mediated through a network-accessible connection service 226, which in some implementations may be a local server accessible to various computing devices in the workplace. In some implementations, the pairing service includes a remote server, or may be provided as a SaaS ("software as a service") system where control and management of the connection service is separate from control of the individual computing devices using the service. Not every system will include all of the depicted services, and other services not depicted may also be provided for the computing devices. Connection services 226 may include a pairing service 228, which manages pairing of specific devices so that they can be used together. Pairing service 228 may in some implementations include storage of user service account information 230. Connection services 226 may also include a control service 232, a teleconferencing service 234 (which may include storage of session record(s) 236 or active session(s) 238), and/or a storage service 240, which may include stored data 242. In some implementations, computing device 202 and companion computing device 222 may also access third-party client service(s) 244 through the network. By communicating via the connection services 226 and optionally third-party client service(s) 244, the computing device 202 and the companion computing device 224 may provide a technical benefit of unobtrusive operation of controls and options to the user, which may be displayed when they are available and not displayed when they are not, achieving a technical benefit of being able to access the controls and options without requiring the user to change settings or otherwise manually manage device behavior.

Figure 3:
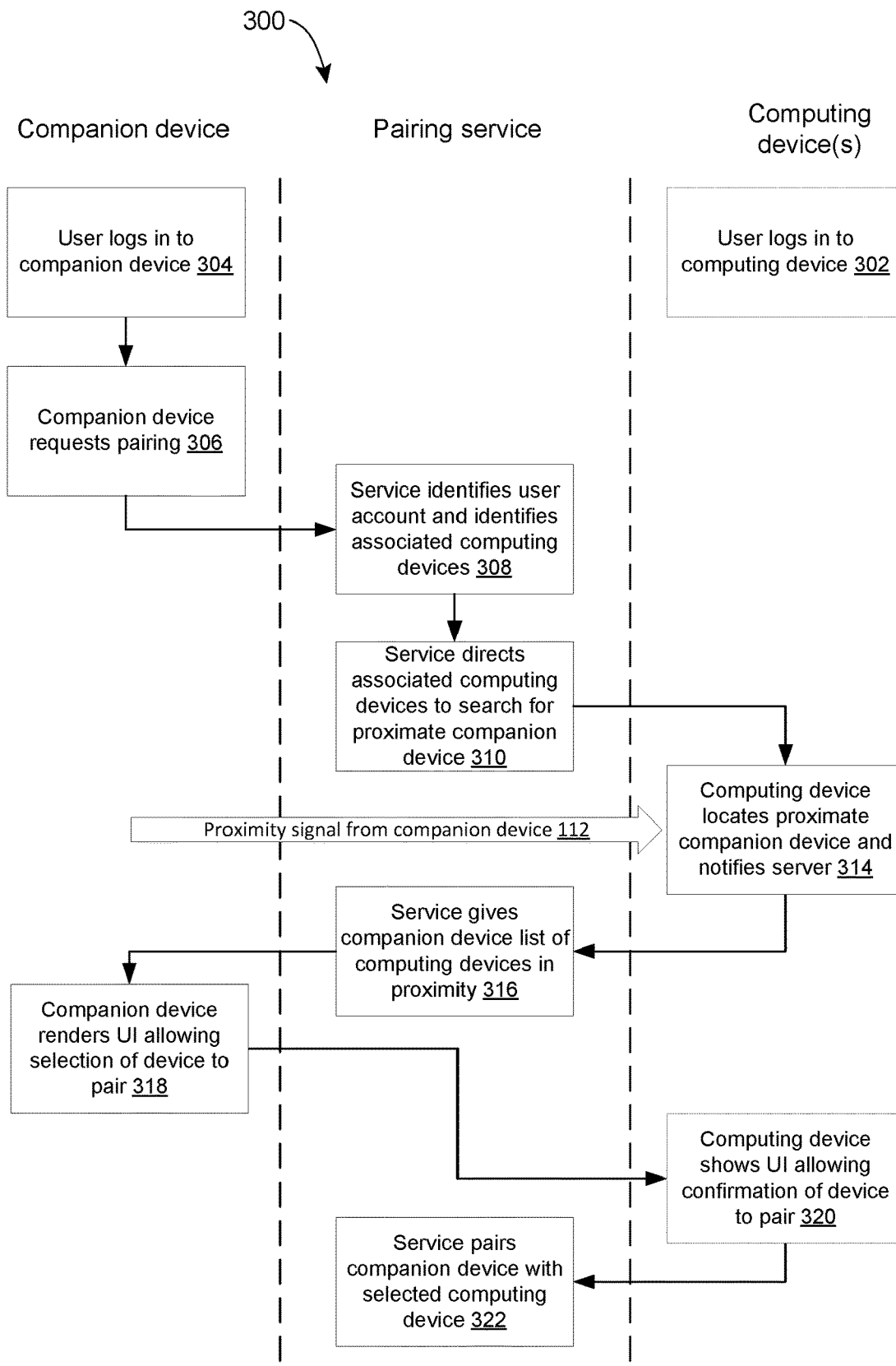
FIG. 3 is a flow chart showing a pairing process.

FIG. 3 is a flow chart depicting an example process 300 for an initial pairing procedure between a companion computing device and another computing device that are initially unpaired. The chart is divided into columns to help illustrate which devices are performing which parts of the illustrated process, but it will be understood that in other implementations, certain steps may be performed by other devices. At some time, usually previous to the rest of the illustrated process, the user has logged into a computing device (step 302). As illustrated in FIG. 3, the user begins the pairing process by logging in to a companion computing device (step 304) and directing it to request to pair with another computing device (step 306). (In other implementations, this step may be performed by the computing device rather than the companion computing device, or initiated by a connection service, for example as part of an assignment of working locations in a hotdesking environment.) For example, a user may have a laptop computer they wish to pair with the companion computing device (which, in some implementations, may be better optimized for video communications with a team). The pairing request is transmitted by the companion computing device to a pairing service, which identifies the user account requesting pairing (step 308). The pairing service 228 is a type of connection service 226 (described above in connection with FIG. 2) that manages pairing of specific devices so that they can be used together to enhance one another's abilities. This identification may be based, for example, on user credentials included in the request (e.g., a password, an identity card, or biometric data), or on a directory of assigned user accounts (for example stored at the pairing service) to determine which user is logged in to the companion computing device. It will be recognized that these are not the only ways to identify the user, and that an equivalent identification method may be used with the described process.

In the process 300 of FIG. 3, having found the user account, the pairing service then identifies computing devices known to be associated with the user account. Different implementations may use different methods of determining which devices are associated with a user account. For example, in some implementations, associated devices may be devices where the user is currently logged in, devices where the user has ever been logged in, devices where the user has been logged in within a particular time period, devices that have been authorized for pairing with a particular user by an organizational parent, or some combination of these.

Once the pairing service has identified devices that are associated with the user account, it directs those devices to determine whether they are in proximity to the companion computing device (step 310) and to notify the pairing service if they are. (As used herein, in one implementation, devices are "in proximity" to one another if they are nearby or near at hand, so that a user might plausibly use them at the same time or in quick succession. Devices in proximity to one another may be in the same room or the same immediate environment.) In the illustrated implementation, determination of proximity is accomplished by the companion computing device sending out a proximity signal 312 (such as a BLUETOOTH® signal), and the identified computing device checking to see if it is receiving the signal. In this type of implementation, the pairing service may pass identifying information for the BLUETOOTH® signal to the identified computing device so that it will not be confused by other BLUETOOTH® devices that may be transmitting in its area. In other implementations, the pairing service may direct the identified computing device(s) to transmit BLUETOOTH® signals that the companion computing device may identify for pairing, reversing the direction of arrow 312 but otherwise accomplishing the same effect.

The computing device(s) that obtain an indication that they are close enough to the companion computing device to receive its proximity signal transmit an indication of their proximity to the pairing service (step 314). In some embodiments, other data may also be requested by the pairing service to confirm that a proximity signal has been correctly identified. For example, if a computing device reports that it has detected a BLUETOOTH® signal, but the IP address of the computing device does not appear to correspond to the location of the companion computing device, the pairing service may require an additional signal to confirm that the proximity has been identified correctly. For example, the pairing service may send a code to the companion computing device for transmission to the computing device. If the computing device receives the code and provides it to the pairing service correctly, the pairing service may conclude that the devices really are in proximity. In the illustrated implementation, the pairing service then provides a list of proximate computing devices to the companion computing device (step 316), which is configured to render a user interface (UI) in response to receiving this list, enumerating the listed devices and allowing the user to select a listed device to pair (step 318). The rendered UI is discussed in more detail below in connection with FIG. 5 and FIG. 6. In response to receiving a user selection of a device to pair, the companion computing device notifies the pairing service which computing device has been selected via the UI. In some implementations, the user must also confirm the pairing on the computing device (step 320). In such implementations, this step may be mediated through the pairing service or it may be negotiated at a peer-to-peer level between the computing device and the companion computing device. In some implementations, step 320 may be skipped, for example because the direct communication via the proximity signal 312 is considered sufficient to confirm that the correct devices are being paired. Finally, the pairing service logically pairs the companion computing device and the computing device together (step 322), so that the companion computing device may be used as discussed above to enhance operation of the computing device (or vice versa).

Figure 4:
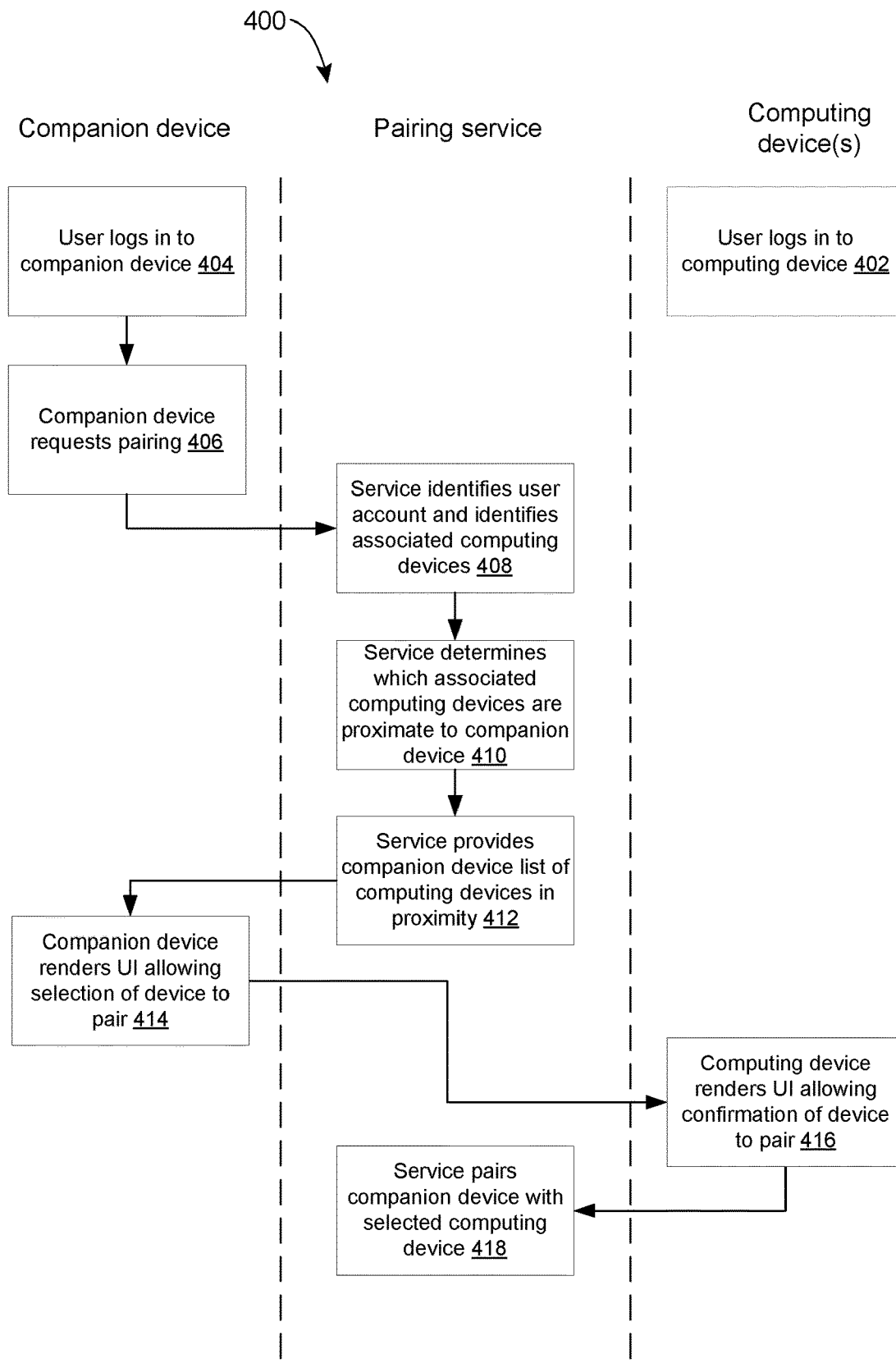
FIG. 4 is a flow chart showing a different pairing process.

FIG. 4 shows an alternate flow for pairing. This process 400 begins in the same way as process 300, with the user logging to a computing device (step 402, which may in some implementations occur substantially before the other steps), logging in to a companion device (step 404) and then requesting pairing with a companion computing device (step 406). The pairing service again finds the user account and identifies associated computing devices (step 408). However, once the pairing service has identified devices that are associated with the user account, rather than directing the associate computing device(s) to try to detect a proximity signal from the companion computing device as shown in FIG. 3, the pairing service determines which devices are proximate to the companion device (step 410). This determination may be made, for example, by examining the IP addresses of the companion device and the computing device(s), or by using other data that may be transmitted to the pairing service as part of the request or otherwise accessible to the pairing server, like a facial recognition performed by the companion computing device in combination with a scan of an RFID-enabled employee badge as part of logging in to the computing device. Once the pairing service has determined that the computing device and the companion computing device are proximate to one another, the process proceeds as it did in FIG. 3. The pairing service provides a list of computing devices for pairing to the companion computing device (step 412), and the companion computing device renders a UI allowing the user to select a device to pair (step 414). In response to receiving a user selection of a device to pair, the companion computing device notifies the pairing service which computing device has been selected via the UI. In some implementations, the user must also confirm the pairing on the computing device (step 416). Finally, the pairing service logically pairs the companion computing device and the computing device together (step 418), so that the companion computing device may be used as discussed above to enhance operation of the computing device (or vice versa).

Figure 5:
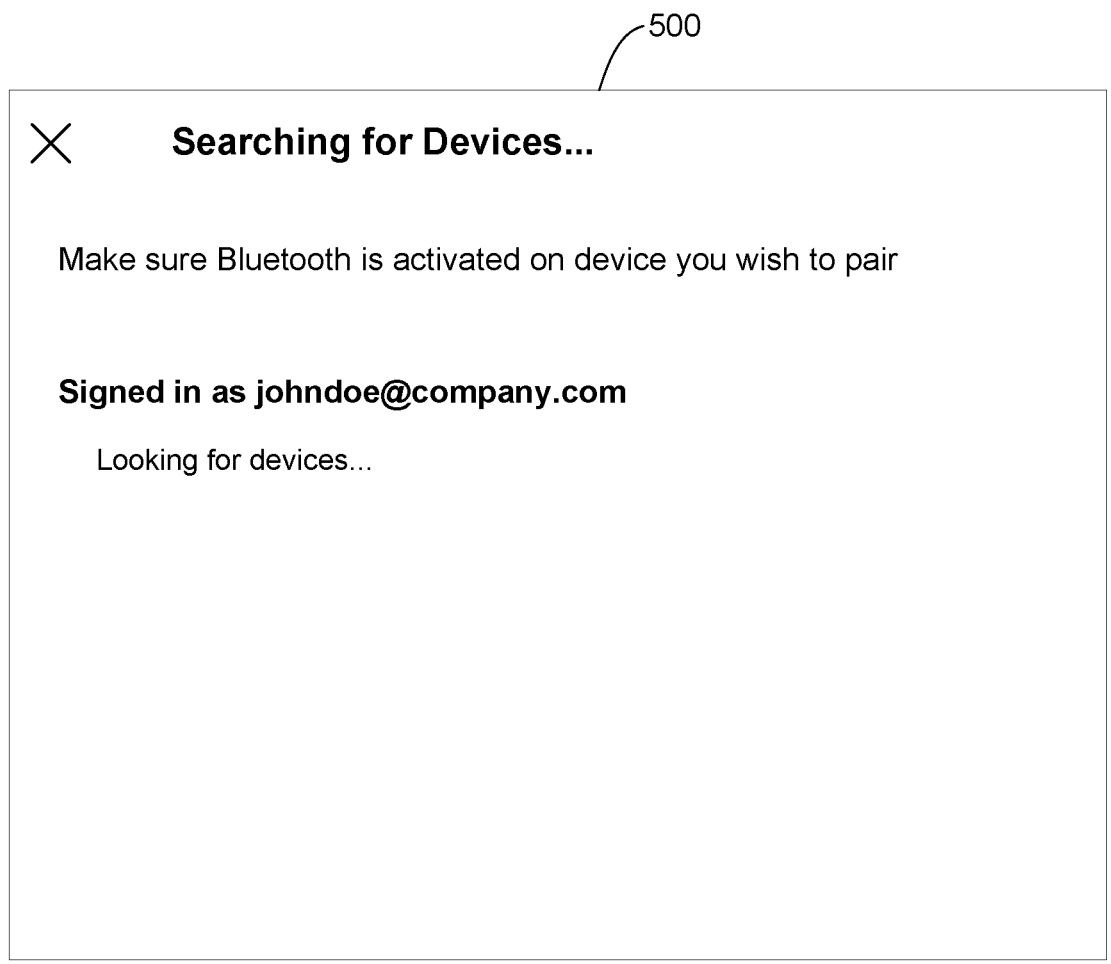
FIG. 5 is an abstracted view of a user interface (UI) near the beginning of a pairing process.

FIG. 5 shows a schematic dialog box 500 of a user interface for pairing a companion computing device with a computing device. At the point shown, user "johndoe@company.com" has logged on to the companion computing device and requested pairing (step 306 of FIG. 3 above). The companion device is requesting pairing from the pairing service, which is searching for devices associated with "johndoe@company.com" to offer for pairing. In the illustrated implementation, a reminder prompts the user to turn on BLUETOOTH® on the devices that he wishes to pair. Features for permitting this request to be made of the pairing service may be implemented in hardware (for example, by providing a pairing button or circuitry for using buttons having other functions for the special-purpose function of pairing), in software (for example, by providing a settings menu), or in a combination of the two.

Figure 6:
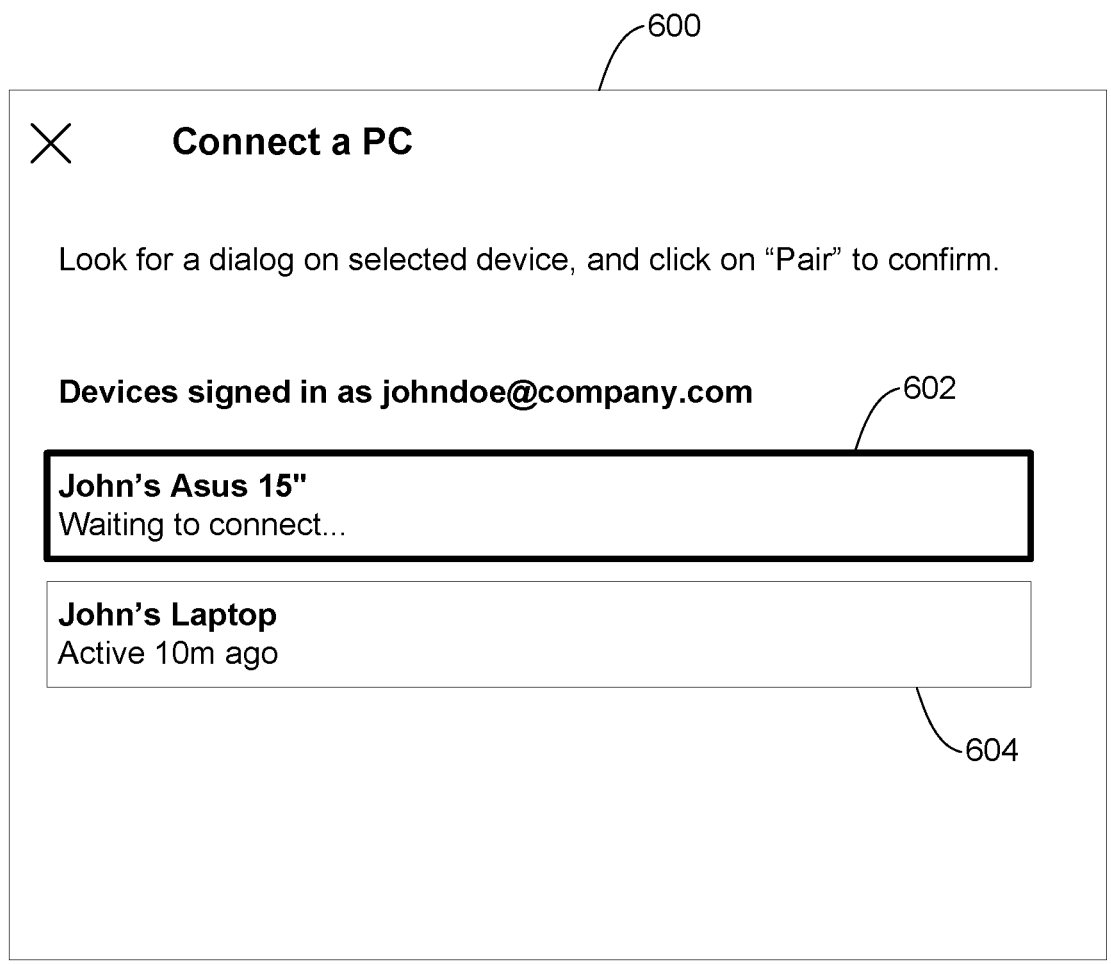
FIG. 6 is an abstracted view of a UI at a later stage of the pairing process.

FIG. 6 shows a later schematic dialog box 600 of the user interface. The pairing service has provided a list of two devices, John's Asus 15" (box 602) and John's Laptop (box 604). As shown in dialog box 600 of FIG. 6, the user has selected John's Asus 15" 602 (as indicated by a heavier outline and the phrase "Waiting to connect . . . "). In the illustrated implementation, the companion computing device is waiting for the user to confirm this selection on the named computer (step 320 of FIG. 3). As mentioned above, in other implementations, this confirmation step may not be required before the devices are paired. In some implementations, even if multiple computing devices are in proximity to the companion computing device, only a single pairing option may be offered, for example the pairing with the strongest radio signal or pairing with the device with the most recent login. In some implementations, it may be possible to pair a single companion computing device with multiple computing devices, or to pair a single computing device with multiple companion computing devices.

Figure 7:
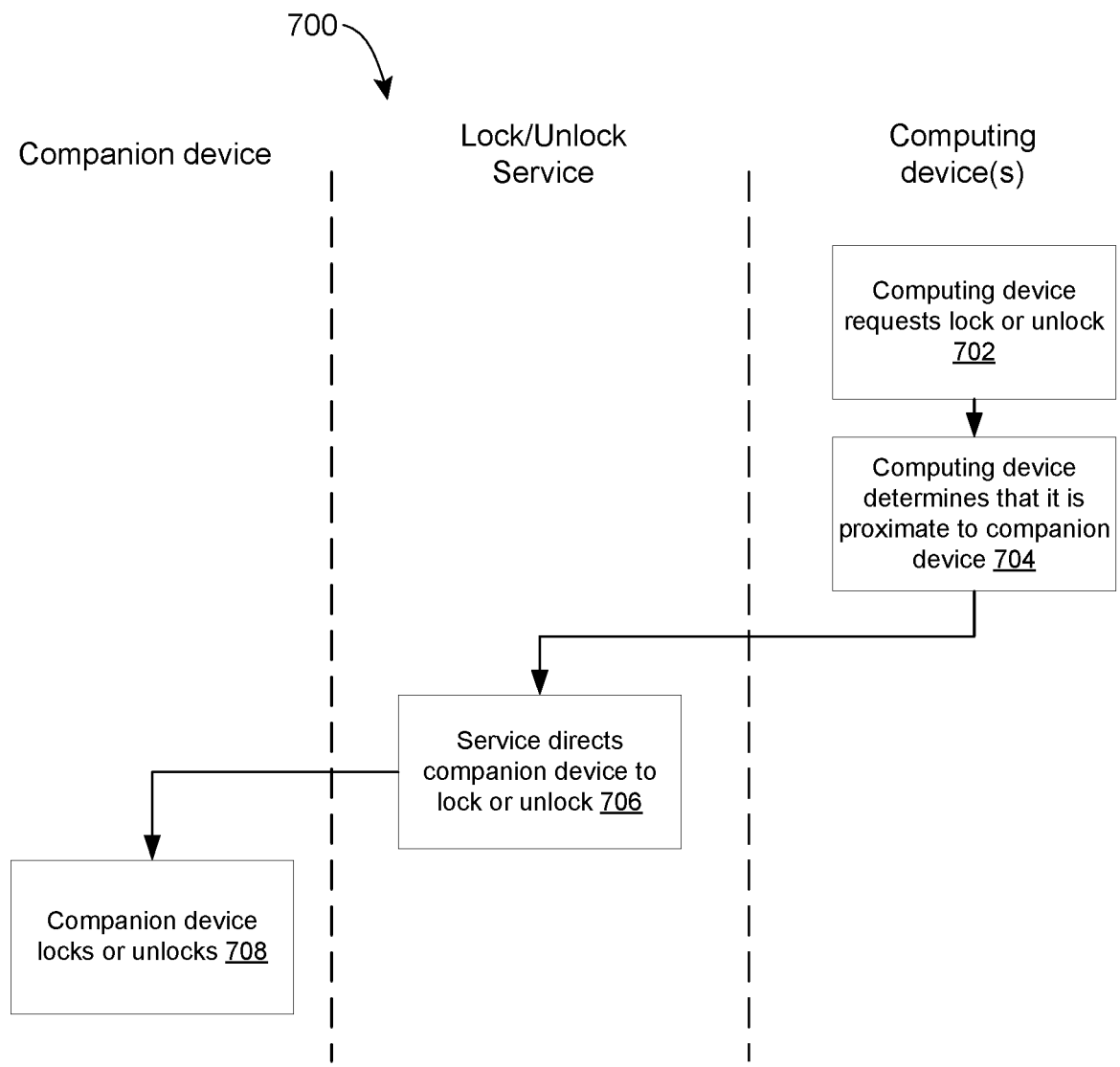
FIG. 7 is a flow chart showing a lock/unlock process.

Once the companion computing device and the computing device have been paired, they may also work together to facilitate easy locking and unlocking of both devices. FIG. 7 is a flow diagram 700 illustrating this process, which may be used after the companion computing device and the computing device have been paired and their work together is being facilitated by a connection service 226, for example a lock/unlock service specifically tasked with managing coordination of locking and unlocking for computing devices working together. If, for example, a user is at a desk using both a computing device and a companion computing device, but the user wishes to leave the desk for a moment, many organizations require that the devices be locked so that no one else can interfere with the work in progress on the devices. Therefore, the user may lock his desktop device using whatever UI has been provided for that device (step 702). (For example, he may click an icon or move his mouse to a "locking" area of the screen.) When he takes the lock action on the computing device, that device locks, and it also determines that it is being used in conjunction with a companion device (step 704). This determination may be made in the same way that a pairing decision was made, using a proximity signal, IP address, or other methods described above.

Once the computing device has determined that the user is using both the computing device and the companion computing device and that it has received a lock action from the computing device, it notifies the connection service to direct the companion device to lock (step 706), and the companion computing device locks (step 708). As seen by the user, locking the computing device automatically locks the paired companion device at the same time. But if the user is, for example, using a laptop in a conference room out of range of the companion computing device, then the laptop will not determine that the devices are proximate to one another (step 704), and so it will not carry out step 706 and notify the lock/unlock service to lock the companion computing device, so only the computing device that was locked by the user will lock. Thus, if someone else is logged in as the user in another location (for example, a spouse at home is using a work PC in the home to place a takeout order) and locks that device, the lock/unlock service will not automatically lock the companion computing device at the office.

The same set of steps can be carried out when the user returns to the computing device and unlocks it (step 702). The computing device sees that the device is unlocked, and it determines that the paired companion computing device is proximate to it (step 704). It then notifies the lock/unlock service (step 706), which unlocks the companion computing device (step 708). In addition to the steps described above, the companion computing device may be configured to lock if, for example, it loses proximity with the paired computing device. This configuration protects the integrity of the system if, for example, the user forgets to explicitly lock the companion computing device when leaving his desk with his computing device. In some implementations, the companion computing device may further be configured to unlock upon regaining proximity to the computing device. From the user's point of view, this process is seamless and is carried out without any need to directly work with the companion device, which is simply available when needed and locked when the user is away.

Figure 8:
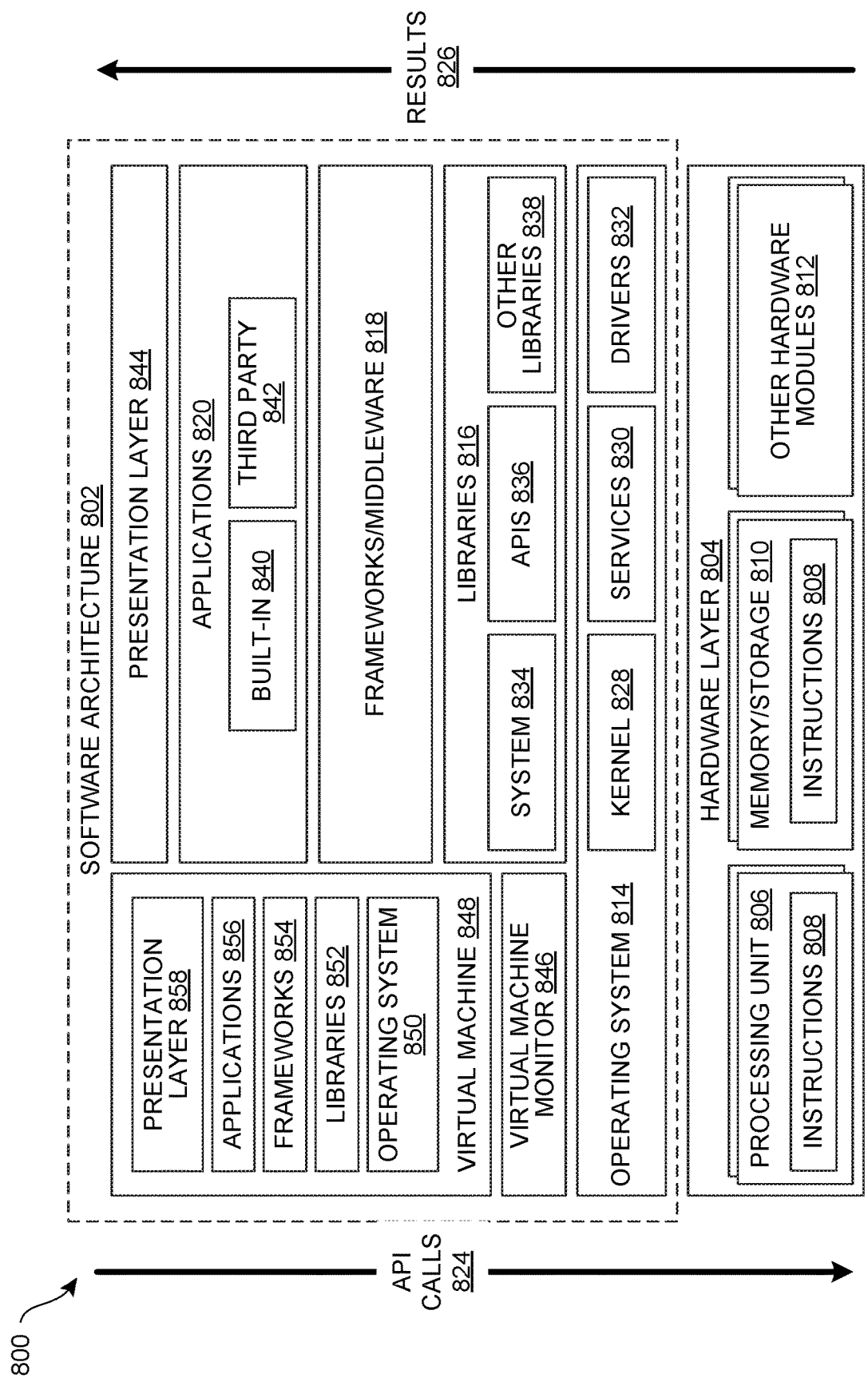
FIG. 8 is a block diagram of an example computing device, which may be used to provide implementations of the systems and methods described herein.

FIG. 8 is a non-limiting example of a software architecture and it will be appreciated that many other architectures may be implemented to facilitate the functionality described herein. The software architecture 802 may execute on hardware such as the data processing system running the methods described below that may include, among other things, document storage, processors, memory, and input/output (I/O) components. A representative hardware layer 804 is illustrated and can represent, for example, the devices described herein. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine. The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
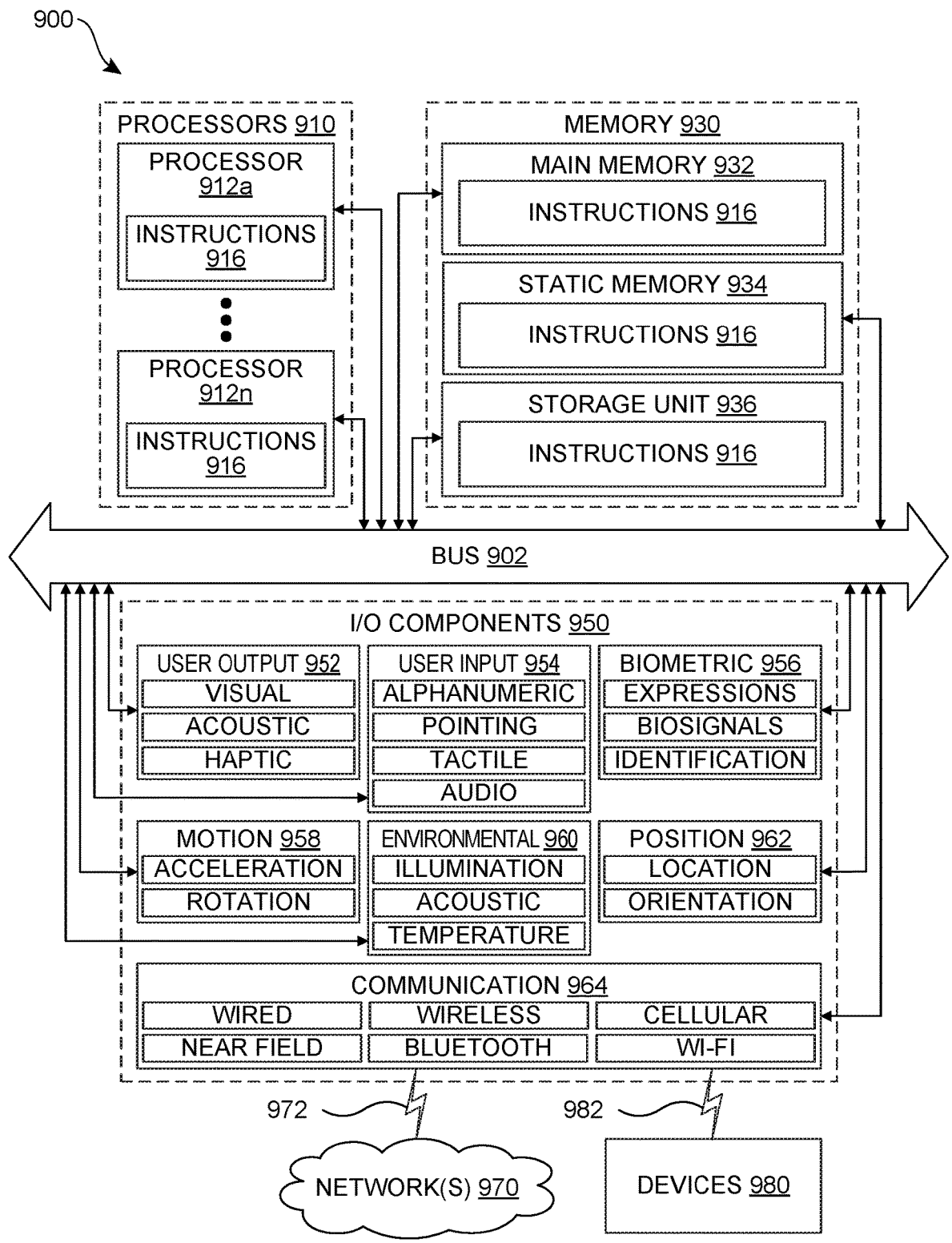
FIG. 9 is a block diagram illustrating components of an example machine configured to read instructions from a machine-readable medium.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), BLUETOOTH® communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, BLUETOOTH®, or other wireless station identification and/or signal triangulation.

In the following, further features, characteristics and advantages of the invention will be described by means of items:

Item 1: A pairing system including a processor and machine-readable media including instructions. The instructions, when executed by the processor, cause the processor to receive over a communication network a pairing request signal to pair a companion computing device, and in response to the received pairing request signal identify a user account associated with the pairing request signal, determine that the identified user account is associated with a first computing device, determine that the first computing device is in proximity to the companion computing device, and pair the companion computing device with the first computing device.

Item 2: The pairing system of Item 1, wherein to identify the user account is associated with the pairing request signal, the machine-readable media further includes instructions which, when executed by the processor, cause the processor to receive user credentials with the pairing request signal.

Item 3: The pairing system of Item 1 or 2, wherein to identify the user account is associated with the pairing request signal, the machine-readable media further includes instructions which, when executed by the processor, cause the processor to consult a stored directory of companion computing devices and associated user accounts.

Item 4: The pairing system of any of Items 1-3, wherein to determine that identified user account is associated with the first computing device, the machine-readable media further includes instructions which, when executed by the processor, cause the processor to consult a stored directory of computing devices and associated user accounts.

Item 5: The pairing system of any of Items 1-4, wherein to determine that identified user account is associated with the first computing device, the machine-readable media further includes instructions which, when executed by the processor, cause the processor to determine that the user account is logged in to the first computing device.

Item 6: The pairing system of any of Items 1-5, wherein to determine that identified user account is associated with the first computing device, the machine-readable media further includes instructions which, when executed by the processor, cause the processor to determine that the pairing service has a record that the user account has logged into the first computing device within a selected time period.

Item 7: The pairing system of any of Items 1-6, wherein to determine that identified user account is associated with the first computing device, the machine-readable media further includes instructions which, when executed by the processor, cause the processor to direct one or more local devices to monitor for a short range communication signal from the companion computing device.

Item 8: The pairing system of any of Items 1-7, wherein the short range communication signal includes identifying information for the companion computing device.

Item 9: The pairing system of any of Items 1-8, wherein to direct the one or more local devices to monitor for the short range communication signal from the companion computing device, the machine-readable media further includes instructions which, when executed by the processor, cause the processor to send the identifying information for the companion computing device from the pairing system to the one or more local devices.

Item 10: The pairing system of any of Items 1-9, wherein to determine whether the first device is in proximity to the companion computing device, the machine-readable media further includes instructions which, when executed by the processor cause the processor to direct the companion computing device to monitor for a short range communication signal from the first computing device.

Item 11: The pairing system of any of Items 1-10, wherein the machine-readable media further includes instructions which, when executed by the processor, cause the processor to determine that a second device is in proximity to the companion computing device, and direct the companion computing device to display options to pair to the first device or to the second device.

Item 12: The pairing system of any of Items 1-11, wherein the machine-readable media further includes instructions which, when executed by the processor, cause the processor to pair the companion computing device to both the first device and the second device.

Item 13: A method of pairing, including receiving a request to pair a companion computing device with a computing device, identifying a user account currently linked with the companion computing device, determining that the user account is associated with a first computing device, in response to the received request, determining that the first computing device is in proximity to the companion computing device, and in response to the determination that the first computing device is in proximity to the companion computing device, sending the companion computing device identifying information for the first computing device, the identifying information being sufficient to permit the companion computing device to present an option to pair the companion computing device to the first computing device.

Item 14: The method of Item 13, further including pairing the companion computing device with the first computing device.

Item 15: The method of Item 13 or 14, further including directing the first computing device to present an option to pair the companion computing device with the first computing device.

Item 16: The method of any of Items 13-15, further including storing a directory of one or more companion computing devices and their linked users, wherein determining that the user is linked with the companion computing device includes consulting the stored directory.

Item 17: The method of any of Items 13-16, wherein determining that the user is linked with the companion computing device includes receiving user credentials.

Item 18: The method of any of Items 13-17, wherein a second computing device associated with the user is in proximity to the companion computing device, and wherein presenting an option to pair the companion computing device with the first computing device further includes presenting an option to pair the companion computing device with the second computing device.

Item 19: The method of any of Items 13-18, wherein the presenting an option to pair the companion computing device with the second computing device includes pairing the companion device with both the first computing device and the second computing device.

Item 20: A server configured to manage a user device and a companion computing device paired with the user device, the server including a processor and machine-readable media including instructions. The instructions, when executed by the processor, cause the processor to receive a request to lock or unlock from the user device, and, in response to the received request, determine that the user device and the companion computing device are in proximity to one another, and lock or unlock both the user device and the companion computing device to comply with the request.

Item 21: A companion computing device, including a processor and machine-readable media including instructions. The instructions, when executed by the processor, cause the processor to accept a user input to pair the companion computing device with a computing device; in response to accepting the user input to pair the companion computing device with a computing device, send a request to a pairing service to pair the companion computing device with a computing device, and broadcast a proximity-detecting signal; receive from the pairing service a list of proximate computing devices; render the list of proximate computing devices in a user-perceivable format; and accept a user selection of a computing device from the list.

Item 22: The companion computing device of Item 21, wherein the machine-readable media further includes instructions which, when executed by the processor, cause the processor to provide the user selection to the pairing service.

Item 23: The companion computing device of Item 21 or 22, wherein the proximity-detecting signal includes a BLUETOOTH® signal.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A pairing system comprising:
a processor; and
machine-readable media including instructions which, when executed by the processor, cause the processor to:
receive over a communication network a pairing request signal from a companion computing device to pair the companion computing device with another computing device in proximity of the companion computing device; and
in response to the received pairing request signal:
identify a user account associated with the pairing request signal;
determine, after identifying the user account, that the identified user account is associated with a first computing device;
determine that the first computing device is in proximity to the companion computing device; and
pair the companion computing device with the first computing device based on the determining that the first computing device is in proximity to the companion computing device.

2. The pairing system of claim 1, wherein to identify the user account is associated with the pairing request signal, the machine-readable media further includes instructions which, when executed by the processor, cause the processor to receive user credentials with the pairing request signal.

3. The pairing system of claim 1, wherein to identify the user account is associated with the pairing request signal, the machine-readable media further includes instructions which, when executed by the processor, cause the processor to consult a stored directory of companion computing devices and associated user accounts.

4. The pairing system of claim 1, wherein to determine that the identified user account is associated with the first computing device, the machine-readable media further includes instructions which, when executed by the processor, cause the processor to consult a stored directory of computing devices and associated user accounts.

5. The pairing system of claim 1, wherein to determine that the identified user account is associated with the first computing device, the machine-readable media further includes instructions which, when executed by the processor, cause the processor to determine that the user account is logged in to the first computing device.

6. The pairing system of claim 1, wherein to determine that the identified user account is associated with the first computing device, the machine-readable media further includes instructions which, when executed by the processor, cause the processor to determine that the pairing system has a record that the user account has logged into the first computing device within a selected time period.

7. The pairing system of claim 1, wherein to determine that the identified user account is associated with the first computing device, the machine-readable media further includes instructions which, when executed by the processor, cause the processor to direct one or more local devices to monitor for a proximity signal from the companion computing device.

8. The pairing system of claim 7, wherein the proximity signal includes identifying information for the companion computing device.

9. The pairing system of claim 8, wherein to direct the one or more local devices to monitor for the proximity signal from the companion computing device, the machine-readable media further includes instructions which, when executed by the processor, cause the processor to send the identifying information for the companion computing device from the pairing system to the one or more local devices.

10. The pairing system of claim 1, wherein to determine whether the first device is in proximity to the companion computing device, the machine-readable media further includes instructions which, when executed by the processor cause the processor to direct the companion computing device to monitor for a proximity signal from the first computing device.

11. The pairing system of claim 1, wherein the machine-readable media further includes instructions which, when executed by the processor, cause the processor to:
determine that a second device is in proximity to the companion computing device; and
direct the companion computing device to display options to pair to the first device or to the second device.

12. The pairing system of claim 11, wherein the machine-readable media further includes instructions which, when executed by the processor, cause the processor to:
pair the companion computing device to both the first device and the second device.

13. A method of pairing, comprising:
receiving a request to pair a companion computing device with a computing device;
identifying a user account currently linked with the companion computing device;
determining that the user account is associated with a first computing device;
in response to the received request, determining that the first computing device is in proximity to the companion computing device; and
in response to the determination that the first computing device is in proximity to the companion computing device, sending the companion computing device identifying information for the first computing device, the identifying information being sufficient to permit the companion computing device to present an option to pair the companion computing device to the first computing device,
the method further comprising determining that the identified user account is linked with the first computing device by directing one or more local devices to monitor for a proximity signal from the companion computing device,
wherein the proximity signal includes the identifying information for the companion computing device, and,
wherein, to direct the one or more local devices to monitor for the proximity signal from the companion computing device, include sending the identifying information for the companion computing device from a pairing system to the one or more local devices.

14. The method of claim 13, further comprising pairing the companion computing device with the first computing device, and wherein the proximity signal comprises a BLUETOOTH® signal.

15. The method of claim 13, further comprising directing the first computing device to present an option to pair the companion computing device with the first computing device.

16. The method of claim 13, further comprising storing a directory of one or more companion computing devices and their linked users, wherein determining that the user is linked with the companion computing device includes consulting the stored directory.

17. The method of claim 13, wherein determining that the user is linked with the companion computing device includes receiving user credentials.

18. The method of claim 13, wherein a second computing device associated with the user is in proximity to the companion computing device, and wherein presenting an option to pair the companion computing device with the first computing device further includes presenting an option to pair the companion computing device with the second computing device.

19. The method of claim 18, wherein the presenting an option to pair the companion computing device with the second computing device includes pairing the companion device with both the first computing device and the second computing device.

20. A server configured to manage a user device and a companion computing device paired with the user device, comprising:
a processor; and
machine-readable media including instructions which, when executed by the processor, cause the processor to:
after the user device and the companion computing device have been paired,
receive a request to lock or unlock from the user device; and
in response to the received request:
determine that the user device and the companion computing device are in proximity to one another; and
lock or unlock both the user device and the companion computing device to comply with the request based on the determination that the user device and the companion computing device are in proximity to one another.

21. A companion computing device, comprising:
a processor; and
machine-readable media including instructions which, when executed by the processor, cause the processor to:
accept a user input to pair the companion computing device with a computing device;
in response to accepting the user input to pair the companion computing device with a computing device:
send a request from the companion computing device to a pairing service to pair the companion computing device with another computing device in proximity of the companion computing device; and
broadcast a proximity-detecting signal from the companion computing device;
receive from the pairing service a list of proximate computing devices;
render the list of proximate computing devices in a user-perceivable format;
accept a user selection of a computing device from the list based on a determination that the selected computing device shares a user account with the companion computing device; and
pair the companion computing device with the selected computing device based on the determining, from the proximity-detecting signal, that the selected computing device is in proximity to the companion computing device.

22. The companion computing device of claim 21, wherein the machine-readable media further includes instructions which, when executed by the processor, cause the processor to provide the user selection to the pairing service.

23. The companion computing device of claim 21, wherein the proximity-detecting signal includes a BLUETOOTH® signal.

* * * * *